(12) United States Patent
Yamada et al.

(10) Patent No.: US 6,980,585 B2
(45) Date of Patent: Dec. 27, 2005

(54) RECEIVING UNIT, RECEIVING METHOD AND SEMICONDUCTOR DEVICE

(75) Inventors: Yoshikazu Yamada, Kawasaki (JP); Shoji Taniguchi, Kawasaki (JP); Koichi Kuroiwa, Kawasaki (JP); Masami Kanasugi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 868 days.

(21) Appl. No.: 10/102,814

(22) Filed: Mar. 22, 2002

(65) Prior Publication Data

US 2003/0026328 A1  Feb. 6, 2003

(30) Foreign Application Priority Data

Jul. 23, 2001  (JP) ............... 2001-221015

(51) Int. Cl.[7] .............................................. H04L 1/69
(52) U.S. Cl. ...................................... 375/148; 375/150
(58) Field of Search ................................ 375/267, 347, 375/343, 316, 130, 140, 144, 142, 147, 148, 375/150; 370/335, 342, 441

(56) References Cited

U.S. PATENT DOCUMENTS

| | | | | |
|---|---|---|---|---|
| 6,222,834 B1 * | 4/2001 | Kondo | ........................ | 370/342 |
| 6,317,454 B1 * | 11/2001 | Mamori | ........................ | 375/147 |
| 6,670,919 B2 * | 12/2003 | Yoshida | ........................ | 342/378 |
| 6,795,488 B1 * | 9/2004 | Iwakiri | ........................ | 375/148 |
| 2001/0046205 A1 * | 11/2001 | Easton et al. | ................ | 370/209 |
| 2003/0026233 A1 * | 2/2003 | Ohsuge | ........................ | 370/342 |

FOREIGN PATENT DOCUMENTS

| | | |
|---|---|---|
| EP | 0 661 831 A2 | 7/1995 |
| EP | 0 691 754 A2 | 1/1996 |
| EP | 0 884 856 A2 | 12/1998 |
| EP | 0 903 870 A2 | 3/1999 |
| JP | 2000-312166 A | 11/2000 |

* cited by examiner

Primary Examiner—Tesfaldet Bocure
(74) Attorney, Agent, or Firm—Staas & Halsey LLP

(57) ABSTRACT

A receiving unit, receiving method, and semiconductor device that reduce the size of circuits in a receiving unit. A receiving section receives signals sent from a base station and transmitted through a plurality of paths. A path tracking section detects timing of each of the plurality of paths through which the signals received by the receiving section were transmitted. A demodulating section demodulates the received signals by performing a despreading process according to the timing of the plurality of paths detected by the path tracking section. A correlation value calculating section calculates a correlation value between the received signals and a spreading code. A destination selecting section provides output from the correlation value calculating section to the path tracking section in the case of performing a path tracking process by the path tracking section and provides output from the correlation value calculating section to the demodulating section in the case of demodulating the received signals by the demodulating section.

21 Claims, 8 Drawing Sheets

RECEIVING UNIT, RECEIVING METHOD AND SEMICONDUCTOR DEVICE

BACKGROUND OF THE INVENTION (1) Field of the Invention

This invention relates to a receiving unit, receiving method, and semiconductor device and, more particularly, to a receiving unit and method for receiving and demodulating signals sent from a base station and a semiconductor device for processing signals sent from a base station.

(2) Description of the Related Art

With the wideband code division multiple access (W-CDMA) communication system, for example, signals to be sent are spread by the use of a spreading code and then are sent. A mobile station selects optimum path timing for data it receives and performs despreading, synchronous detection, and RAKE combining. As a result, data will be obtained.

After initial synchronization, usually path timing needs to be tracked frequently with a change of channel due to, for example, movement. A mobile station therefore includes a path tracking section for monitoring the timing of a path for a receiving channel.

In addition, with the W-CDMA communication system, handover control for switching a base station with which a mobile station communicates to the optimum one at any time even during receiving data is exercised in order to always realize stable communication even during moving at a high speed. Therefore, the level (signal-to-interference ratio (SIR), for example) of received data which are sent from base stations around the one with which a mobile station is communicating now must also be monitored. As a result, despreading, synchronous detection, and level measurement must be performed not only on data from the base station with which a mobile station is communicating now but also on data from other base stations.

FIG. 8 shows a block diagram of a path tracking section and data demodulating section in a conventional receiving unit which adopts the W-CDMA communication system.

As shown in FIG. 8, a conventional receiving unit which adopts the W-CDMA communication system comprises an antenna 10, receiving circuit 11, A/D converting circuit 12, path tracking section 20, data demodulating section 30, RAKE combining circuit 40, level measuring circuit 41, and power value calculating circuit 42.

The antenna 10 acquires electronic waves sent from a base station.

The receiving circuit 11 converts the electronic waves acquired by the antenna 10 into the corresponding electrical signals.

The A/D converting circuit 12 converts the electrical signals (analog signals) output from the receiving circuit 11 into the corresponding digital signals (hereinafter referred to as "received data") and outputs them.

The path tracking section 20 includes a correlation circuit 21, integrating circuit 22, power value calculating circuit 23, integrating circuit 24, and path selecting circuit 25. The path tracking section 20 selects a path of high power on the basis of the received signals and outputs the timing of the path to the data demodulating section 30 as path information.

The correlation circuit 21 calculates a correlation value obtained from the received data supplied from the A/D converting circuit 12 and a predetermined code, being a spreading code, and outputs it to the integrating circuit 22.

The integrating circuit 22 integrates the data output from the correlation circuit 21 by the slot and outputs the result obtained.

The power value calculating circuit 23 calculates the geometric mean of the data output from the integrating circuit 22 and outputs it.

The integrating circuit 24 integrates the output from the power value calculating circuit 23 by the frame and outputs the result obtained.

The path selecting circuit 25 monitors the data output from the integrating circuit 24, selects several paths in descending order of power value, and outputs their timing as path information.

The data demodulating section 30 includes operating sections 31-1 through 31-n, a memory 32, a synchronous detection circuit 33, and a channel estimation circuit 34. The data demodulating section 30 operates a correlation value obtained from a spreading code and received data according to path information, performs synchronous detection, and outputs the original data.

The operating section 31-1 includes a correlation circuit 31-1a and code generating circuit 31-1b. The correlation circuit 31-1a operates a correlation value obtained from received data and a spreading code supplied from the code generating circuit 31-1b with timing corresponding to path information supplied from the path selecting circuit 25 and outputs the result.

The structure of the operating sections 31-2 through 31-n is the same as that of the operating section 31-1, so descriptions of them will be omitted.

The memory 32 stores data output from the operating sections 31-1 through 31-n in predetermined areas.

The synchronous detection circuit 33 performs synchronous detection on the data stored in the memory 32 and outputs the original data.

The channel estimation circuit 34 integrates the data stored in the memory 32 by the frame and outputs the result.

The RAKE combining circuit 40 causes the time and phases of signals according to paths, which the synchronous detection circuit 33 separated by despreading and output, to match, combines the signals, and outputs the result.

The level measuring circuit 41 measures the level of the data output from the RAKE combining circuit 40.

The power value calculating circuit 42 calculates the geometric mean of the data output from the channel estimation circuit 34 and provides it to the level measuring circuit 41.

Now, the operation of the above conventional receiving unit will be described.

The antenna 10 acquires electronic waves sent from a base station and provides them to the receiving circuit 11.

The receiving circuit 11 converts the electronic waves acquired by the antenna 10 into the corresponding electrical signals and outputs them.

The A/D converting circuit 12 converts the electrical signals (analog signals) supplied from the receiving circuit 11 into the corresponding digital signals and provides them to the path tracking section 20 and data demodulating section 30.

The correlation circuit 21 calculates a correlation value obtained from the received data supplied from the A/D converting circuit 12 and a spreading code supplied from another block (not shown) which corresponds to the base station electronic waves from which are being received by the antenna 10, and outputs it.

The integrating circuit 22 integrates the data output from the correlation circuit 21 by the slot and outputs the result.

The power value calculating circuit 23 calculates the geometric mean of the data which the integrating circuit 0.22 calculated by integrating by the slot, and outputs it as data indicative of the power of the received signals.

The integrating circuit 24 integrates the data output from the power value calculating circuit 23 by the frame (a "frame" is greater than a "slot") and outputs the result.

The path selecting circuit 25 refers to the data output from the integrating circuit 24, selects several (n, in this example) paths in descending order of power of received signal, and outputs their timing as path information.

Each of the operating sections 31-1 through 31-n in the data demodulating section 30 operates a correlation value obtained from a spreading code supplied from a code generating circuit and the received data supplied from the A/D converting circuit 12 in synchronization with timing shown by the path information supplied from the path selecting circuit 25 and outputs it.

The memory 32 stores the data output from the operating sections 31-1 through 31-n in predetermined areas.

The channel estimation circuit 34 integrates one slot of a pilot signal (reference signal), generates a signal indicative of the state of a transmission line (channel), and provides it to the synchronous detection circuit 33 and power value calculating circuit 42.

The RAKE combining circuit 40 causes the time and phases of signals according to paths, which the synchronous detection circuit 33 separated by despreading and output, to match, combines the signals, and outputs the result.

The level measuring circuit 41 measures the level of the data output from the RAKE combining circuit 40.

The power value calculating circuit 42 calculates the geometric mean of the data output from the channel estimation circuit 34 and provides it to the level measuring circuit 41.

However, the conventional receiving unit described above includes the correlation circuit 21 and correlation circuits 31-1a through 31-na, that is to say, (n+1) correlation circuits. This will lead to large-scale circuits because correlation circuits usually need a large circuit area.

SUMMARY OF THE INVENTION

The present invention was made under the background circumstances as described above. An object of the present invention is to provide a receiving unit in which the scale of circuits can be reduced.

In order to achieve the above object, a receiving unit for receiving and demodulating signals sent from a base station is provided. This receiving unit comprises receiving means for receiving signals sent from the base station and transmitted through a plurality of paths, path tracking means for detecting timing of each of the plurality of paths through which the signals received by the receiving means were transmitted, demodulating means for demodulating the received signals by performing a despreading process according to the timing of the plurality of paths detected by the path tracking means, correlation value calculating means for calculating a correlation value between the received signals and a spreading code, and destination selecting means for providing output from the correlation value calculating means to the path tracking means in the case of performing a path tracking process by the path tracking means and for providing output from the correlation value calculating means to the demodulating means in the case of demodulating the received signals by the demodulating means.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will now be described with reference to the drawings.

Figure 1:
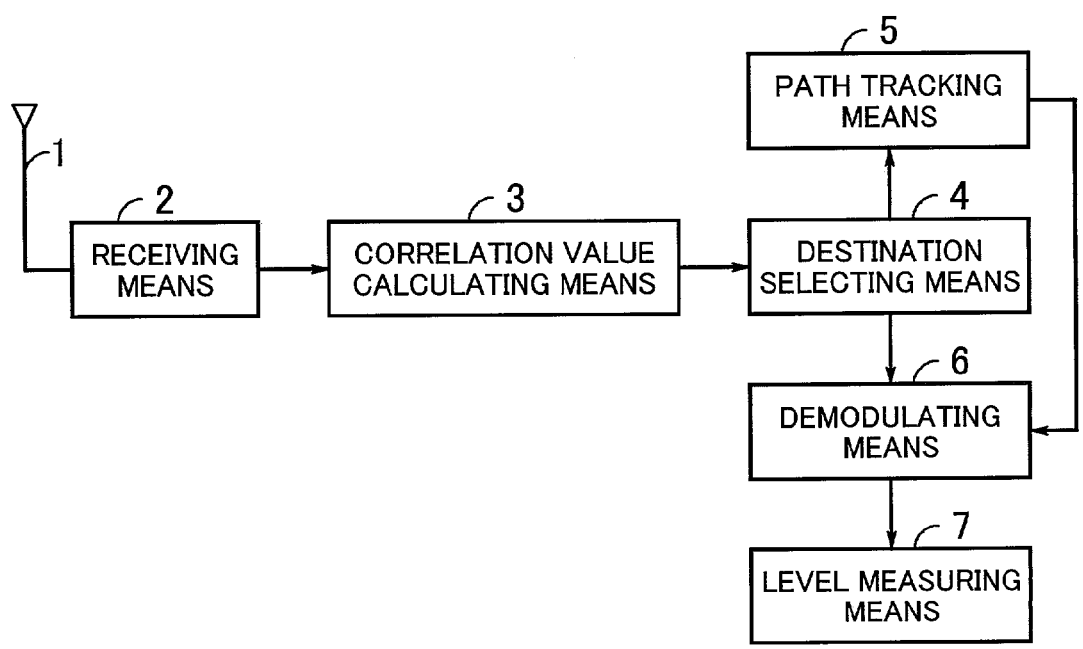
FIG. 1 is a view for describing the operative principles of the present invention.

FIG. 1 is a view for describing the operative principles of the present invention.

As shown in FIG. 1, a receiving unit according to the present invention comprises an antenna 1, receiving means 2, correlation value calculating means 3, destination selecting means 4, path tracking means 5, demodulating means 6, and level measuring means 7.

The receiving means 2 receives signals via the antenna 1 which were sent from a base station and were transmitted through a plurality of paths.

The path tracking means 5 detects the timing of each of paths through which signals received by the receiving means 2 were transmitted.

The demodulating means 6 demodulates received signals by performing a despreading process according to the timing of a plurality of paths detected by the path tracking means 5.

The correlation value calculating means 3 calculates a correlation value between received signals and a spreading code.

The destination selecting means 4 provides output from the correlation value calculating means 3 to the path tracking means 5 in the case of performing a path tracking process by the path tracking means 5 and provides output from the correlation value calculating means 3 to the demodulating means 6 in the case of demodulating received signals by the demodulating means 6.

The level measuring means 7 refers to signals demodulated by the demodulating means 6 and measures the level of received signals.

Now, operation in FIG. 1 will be described.

The receiving means 2 receives electronic waves sent from a base station via the antenna 1 and converts them into the corresponding electrical signals.

The correlation value calculating means 3 calculates a correlation value between the received signals supplied from the receiving means 2 and a spreading code and provides it to the destination selecting means 4. Spreading codes differ among base stations, so a spreading code for the base station with which the receiving unit is communicating now is provided to the correlation value calculating means 3 and is stored there.

When communication is begun between the receiving unit and a predetermined base station, first the destination selecting means 4 provides the results, being data, to the path tracking means 5.

As a result, the path tracking means 5 selects several from among the received signals transmitted through a plurality of paths in descending order of power and provides their timing to the demodulating means 6 as path information.

The demodulating means 6 demodulates the data supplied from the correlation value calculating means 3 on the basis of the path information supplied from the path tracking means 5 and provides the results to the level measuring means 7.

The level measuring means 7 measures the level of the signals supplied from the demodulating means 6.

The path tracking means 5 needs to perform a path tracking process only in a predetermined cycle (every fifty milliseconds, for example), so the output from the correlation value calculating means 3 can be provided to the demodulating means 6 during the remaining time.

The present invention therefore makes it possible to share the correlation value calculating means 3. As a result, the size of circuits can be reduced.

When a base station with which the receiving unit communicates changes, the destination selecting means 4 provides a correlation value to the path tracking means 5 to make it perform a path tracking process. In this case, a path tracking process will not be performed in the above predetermined cycle.

Embodiments of the present invention will now be described.

Figure 2:
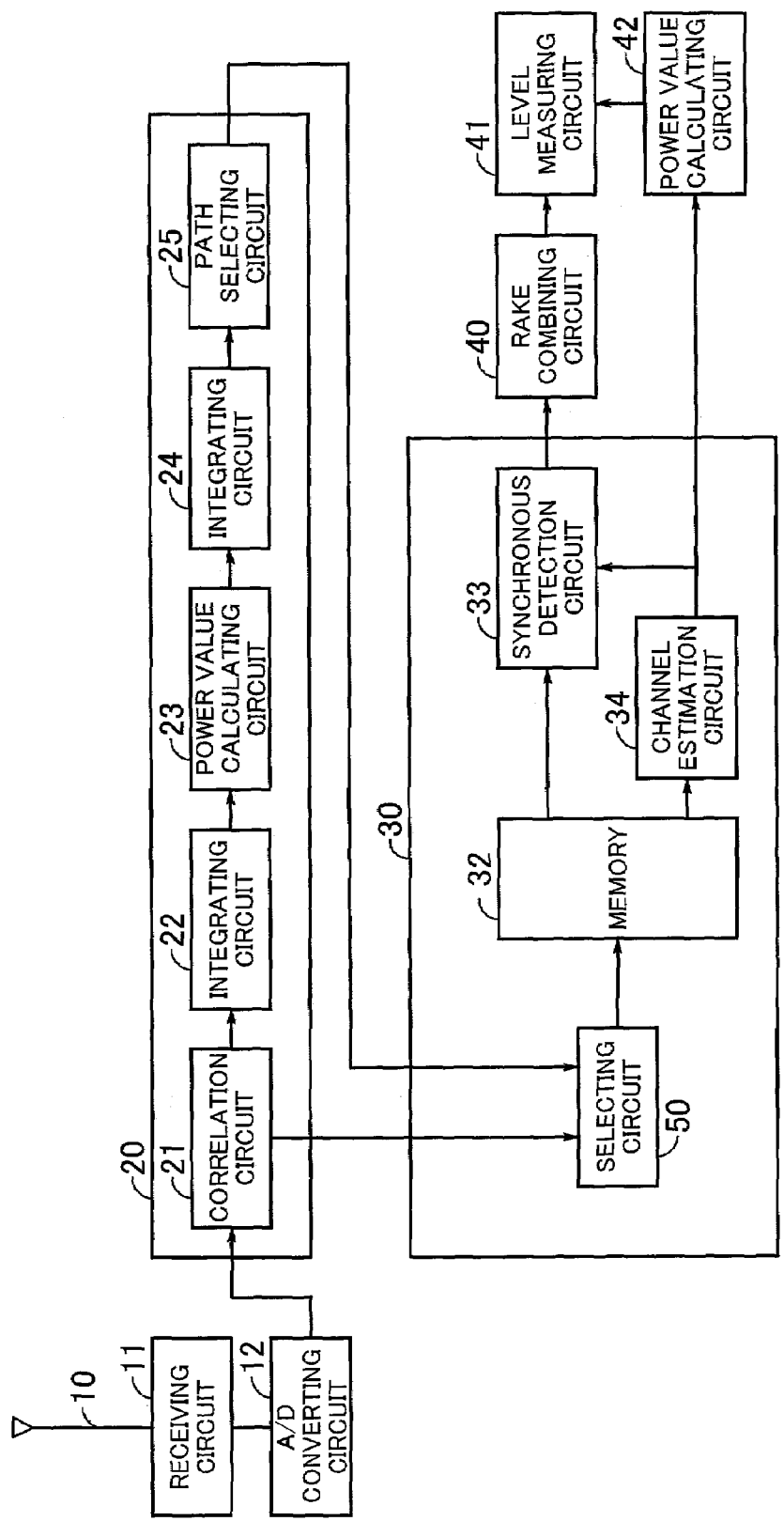
FIG. 2 is a block diagram for describing the structure of a first embodiment of the present invention.

FIG. 2 is a view showing the structure of a first embodiment of the present invention. As shown in FIG. 2, a receiving unit according to the present invention comprises an antenna 10, receiving circuit 11, A/D converting circuit 12, path tracking section 20, data demodulating section 30, RAKE combining circuit 40, level measuring circuit 41, and power value calculating circuit 42.

The antenna 10 acquires electronic waves sent from a base station.

The receiving circuit 11 converts the electronic waves acquired by the antenna 10 into the corresponding electrical signals.

The A/D converting circuit 12 converts the electrical signals (analog signals) output from the receiving circuit 11 into the corresponding digital signals and outputs them.

The path tracking section 20 includes a correlation circuit 21, integrating circuit 22, power value calculating circuit 23, integrating circuit 24, and path selecting circuit 25. The path tracking section 20 selects a path of high power on the basis of received signals and outputs it to the data demodulating section 30 as path information.

The correlation circuit 21 calculates a correlation value obtained from the received data supplied from the A/D converting circuit 12 and a predetermined code, being a spreading code, and outputs it to the integrating circuit 22.

Figure 3:
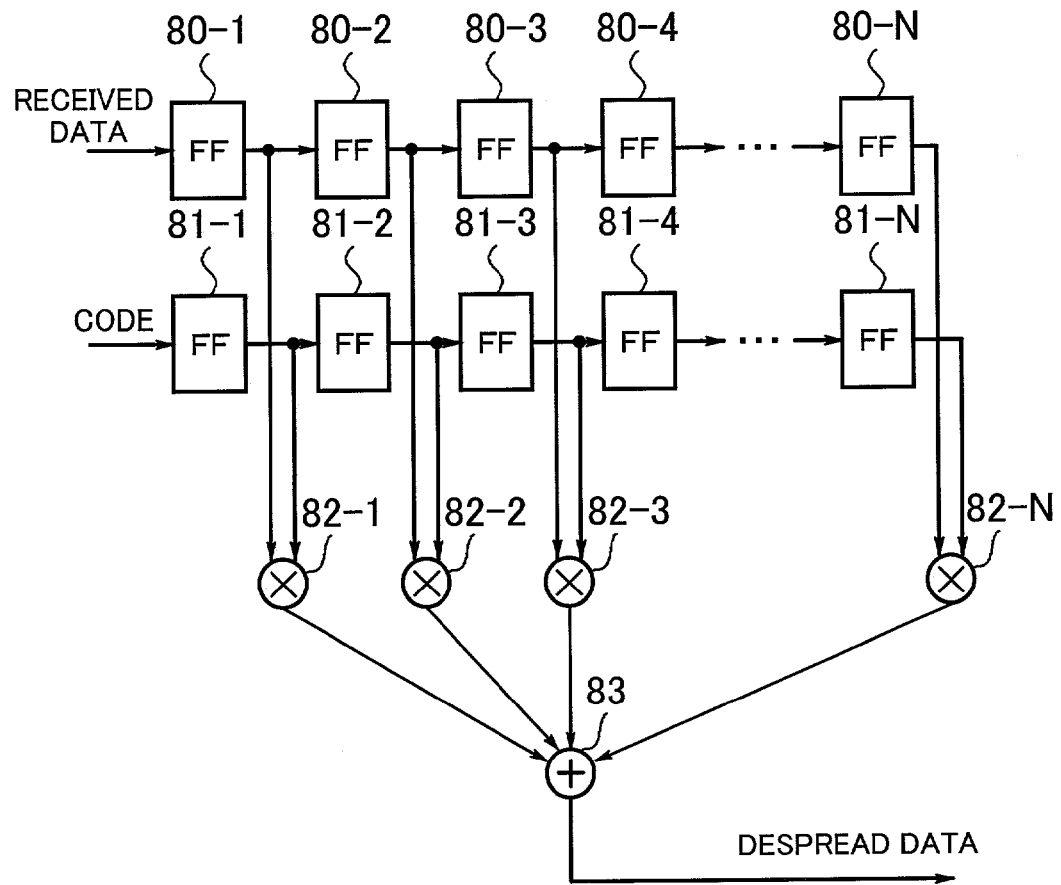
FIG. 3 is a block diagram showing in detail an example of the structure of the correlation circuit shown in FIG. 2.

FIG. 3 is a view showing in detail an example of the structure of the correlation circuit 21.

As shown in FIG. 3, the correlation circuit 21 includes flip-flops (FFs) 80-1 through 80-N, FFs 81-1 through 81-N, multiplying circuits 82-1 through 82-N, and an adding circuit 83.

Received data output from the A/D converting circuit 12 is input to the FF 80-1 and is transferred in turn to the next FF in synchronization with a clock signal supplied from a clock generating circuit (not shown). As a result, the received data will be delayed according to the cycle of a clock signal and be transferred in turn from the FF 80-1 to the FF 80-N.

A code, being a spreading code, is input to the FFs 81-1 through 81-N. If the entire code has been input, the supply of a clock is stopped and the input data is held. The FFs 81-1 through 81-N differ from the FFs 80-1 through 80-N in this respect.

The multiplying circuit 82-1 multiplies data supplied from the FF 80-1 and data supplied from the FF 81-1 together and outputs the result obtained. This is the same with the multiplying circuits 82-2 through 82-N.

The adding circuit 83 operates the sum total of data output from the multiplying circuits 82-1 through 82N and outputs it.

As a result, a correlation value obtained from the received data and spreading code will be output from the adding circuit 83.

Figure 4:
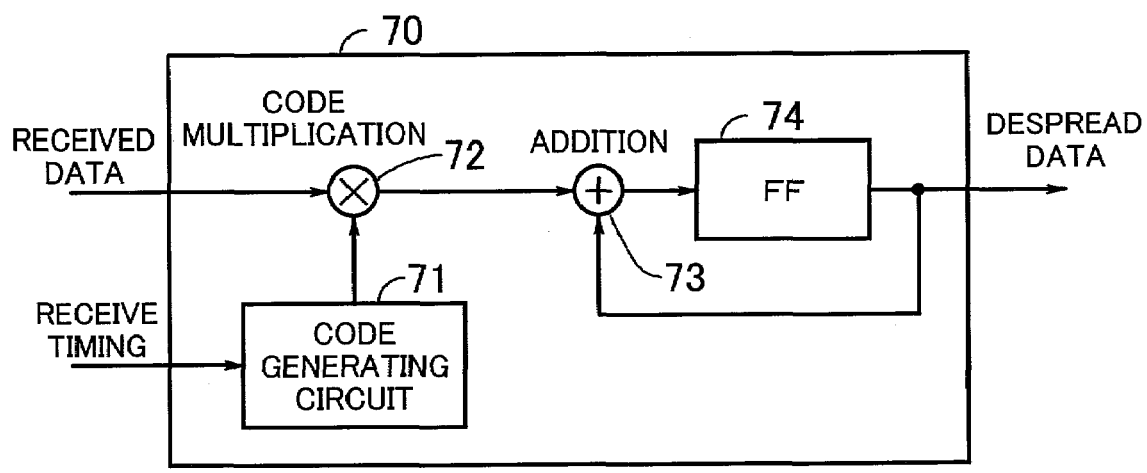
FIG. 4 is a view showing another example of the structure of the correlation circuit.

The correlation circuit 21 described above is what is called a 'matched filter.' By the way, a 'sliding correlation circuit,' like the one shown in FIG. 4, can also be used as a correlation circuit.

In this example, a sliding correlation circuit 70 includes a code generating circuit 71, multiplying circuit 72, adding circuit 73, and FF 74. When a receiving timing signal is provided, the code generating circuit 71 begins to generate a spreading code and provides it to the multiplying circuit 72.

The multiplying circuit 72 multiplies received data and a spreading code together and outputs the result obtained.

The adding circuit 73 adds data output from the multiplying circuit 72 and the preceding data (despread data) output from the FF 74 together and outputs the result.

The FF 74 temporarily stores data output from the adding circuit 73, reads out the data it stores with the timing with which the next data will be output from the multiplying circuit 72, and provides it.

As a result, the FF 74 will output a correlation value obtained from the received data and spreading code.

Compared with a matched filter, a sliding correlation circuit has a simpler structure, but it operates a correlation value only with determined timing. That is to say, a matched filter operates a correlation value obtained from received data input every moment and a spreading code and outputs it. In the present invention, this characteristic is used to enable the path tracking section 20 and data demodulating section 30 to share a correlation circuit.

Now, the describing of FIG. 2 will be resumed.

The integrating circuit 22 integrates data output from the correlation circuit 21 by the slot and outputs the result obtained.

The power value calculating circuit 23 calculates the geometric mean of data output from the integrating circuit 22 and outputs it.

The integrating circuit 24 integrates output from the power value calculating circuit 23 by the frame and outputs the result obtained.

The path selecting circuit 25 monitors data output from the integrating circuit 24, selects several paths in descending order of power value, and outputs their timing as path information.

The data demodulating section 30 includes a selecting circuit 50, memory 32, synchronous detection circuit 33, and channel estimation circuit 34. The data demodulating section 30 operates a correlation value obtained from a spreading code and received data according to path information, performs synchronous detection, and outputs the original data.

The selecting circuit 50 selects data corresponding to paths selected by the path selecting circuit 25 from output from the correlation circuit 21 and outputs it.

The memory 32 stores data output from the selecting circuit 50 in predetermined areas.

The synchronous detection circuit 33 performs synchronous detection on data stored in the memory 32 and outputs the original data.

The channel estimation circuit 34 integrates data stored in the memory 32 by the frame to generate a channel estimation signal and outputs it.

The RAKE combining circuit 40 causes the time and phases of the signals according to paths, which the synchronous detection circuit 33 separated by despreading and output, to match, combines the signals, and outputs the result.

The level measuring circuit 41 measures the level of data output from the RAKE combining circuit 40.

The power value calculating circuit 42 calculates the geometric mean of data output from the channel estimation circuit 34 and provides it to the level measuring circuit 41.

Now, operation in the above embodiment will be described.

The antenna 10 acquires electronic waves sent from a base station and provides them to the receiving circuit 11.

The receiving circuit 11 converts the electronic waves acquired by the antenna 10 into the corresponding electrical signals and outputs them.

The A/D converting circuit 12 converts the electrical signals (analog signals) supplied from the receiving circuit 11 into the corresponding digital signals and provides them to the path tracking section 20 and data demodulating section 30.

The correlation circuit 21 obtains a spreading code unique to a base station, with which the receiving unit is to communicate, from another block (not shown) and stores it in the FFs 81-1 through 81-N. When the A/D converting circuit 12 begins to provide the received data to the path tracking section 20, the received data is delayed in sequence by the FFs 80-1 through 80-N. Output from the FFs 80-1 through 80-N is provided to the multiplying circuits 82-1 through 82-N respectively.

The multiplying circuit 82-1 multiplies the received data output from the FF 80-1 and the spreading code output from the FF 81-1 together and outputs the result obtained. The same applies to the multiplying circuits 82-2 through 82-N.

The adding circuit 83 operates the sum total of the data output from the multiplying circuits 82-1 through 82-N and outputs it as despread data.

The data output from the correlation circuit 21 is provided to the integrating circuit 22. The integrating circuit 22 integrates one slot of the data and outputs the result.

The power value calculating circuit 23 calculates the geometric mean of the data obtained as a result of the integrating circuit 22 integrating by the slot and outputs it as data indicative of the power of the received signal.

The integrating circuit 24 integrates the data output from the power value calculating circuit 23 by the frame (a "frame" is greater than a "slot") and outputs the result.

The path selecting circuit 25 refers to the data output from the integrating circuit 24, selects several (n, in this example) paths in descending order of power of received signal, and outputs their timing as path information.

The path information output from the path selecting circuit 25 is provided to the selecting circuit 50.

The selecting circuit 50 selects data corresponding to the several paths, which were selected in descending order of power of received signal, from among the correlation values output from the correlation circuit 21 and provides it to the memory 32.

The blocks behind the correlation circuit 21 operate in a predetermined cycle or when a base station changes. At that point in time, the path selecting circuit 25 selects several paths in descending order of power of received signal and informs the selecting circuit 50 of them.

The memory 32 stores the data selected by the selecting circuit 50 in predetermined areas.

The channel estimation circuit 34 integrates one slot of a pilot signal (reference signal), generates a signal indicative of the state of a transmission line (channel), and provides it to the synchronous detection circuit 33 and power value calculating circuit 42.

The RAKE combining circuit 40 causes the time and phases of signals according to paths, which the synchronous detection circuit 33 separated by despreading and output, to match, combines the signals, and outputs the result.

The level measuring circuit 41 measures the level of the data output from the RAKE combining circuit 40.

The power value calculating circuit 42 calculates the geometric mean of the data output from the channel estimation circuit 34 and provides it to the level measuring circuit 41.

This enables the path tracking section 20 and data demodulating section 30 to share the correlation circuit 21. As a result, the size of circuits can be reduced.

In the above embodiment, the selecting circuit 50 selects output from the correlation circuit 21. However, another method may be adopted. For example, the entire data is stored in the memory 32 and only data corresponding to output from the path selecting circuit 25 is read out from the memory 32.

Figure 5:
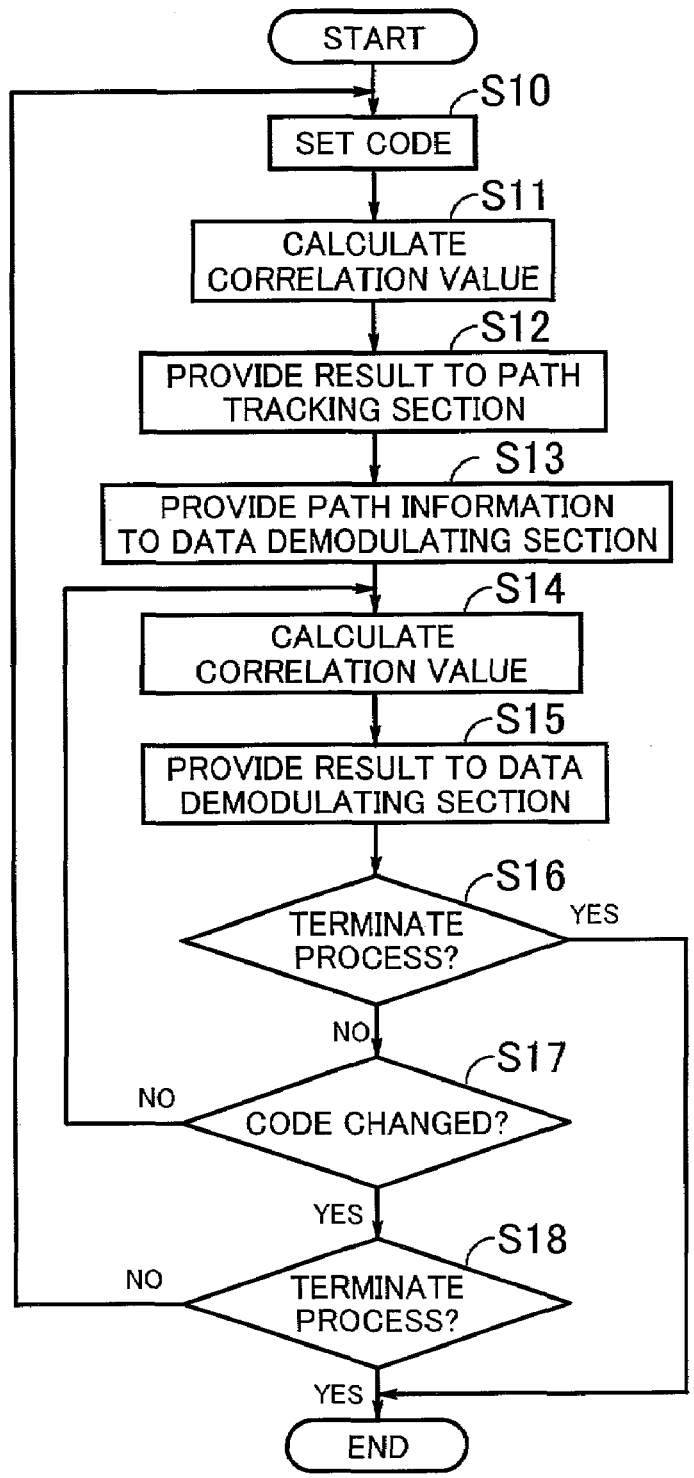
FIG. 5 is a flow chart for describing an example of a process performed in the embodiment shown in FIG. 2.

FIG. 5 is a flow chart for describing the above operation. The following steps will be performed in compliance with this flow chart.

[Step S10] The correlation circuit 21 sets a code, being a spreading code, in the FFs 81-1 through 81-N.

[Step S11] The correlation circuit 21 provides received data output from the A/D converting circuit 12 to the FFs 80-1 through 80-N and calculates a correlation value obtained from the received data and spreading code.

[Step S12] The correlation circuit 21 provides a correlation value obtained by the operation to the path tracking section 20.

[Step S13] The path selecting circuit 25 provides path information obtained by operating the output from the correlation circuit 21 to the selecting circuit 50 in the data demodulating section 30.

[Step S14] The correlation circuit 21 provides received data output from the A/D converting circuit 12 to the FFs 80-1 through 80-N and calculates a correlation value obtained from the received data and spreading code.

[Step S15] The correlation circuit 21 provides data obtained by the operation to the selecting circuit 50 in the data demodulating section 30.

[Step S16] A control section (not shown) judges whether to terminate the process or not. If the control section does not terminate the process, it proceeds to step S17. The control section terminates the process otherwise.

[Step S17] The control section (not shown) judges whether or not the code, being the spreading code, corresponding to the base station has changed. If the code has changed, the control section proceeds to step S18. If the code has not changed, the control section returns to step S14 to repeat the same process.

[Step S18] The control section (not shown) judges whether to terminate the process or not. If the control section does not terminate the process, it proceeds to step S10. The control section terminates the process otherwise.

This process will realize the function described above.

Now, a second embodiment of the present invention will be described.

Figure 6:
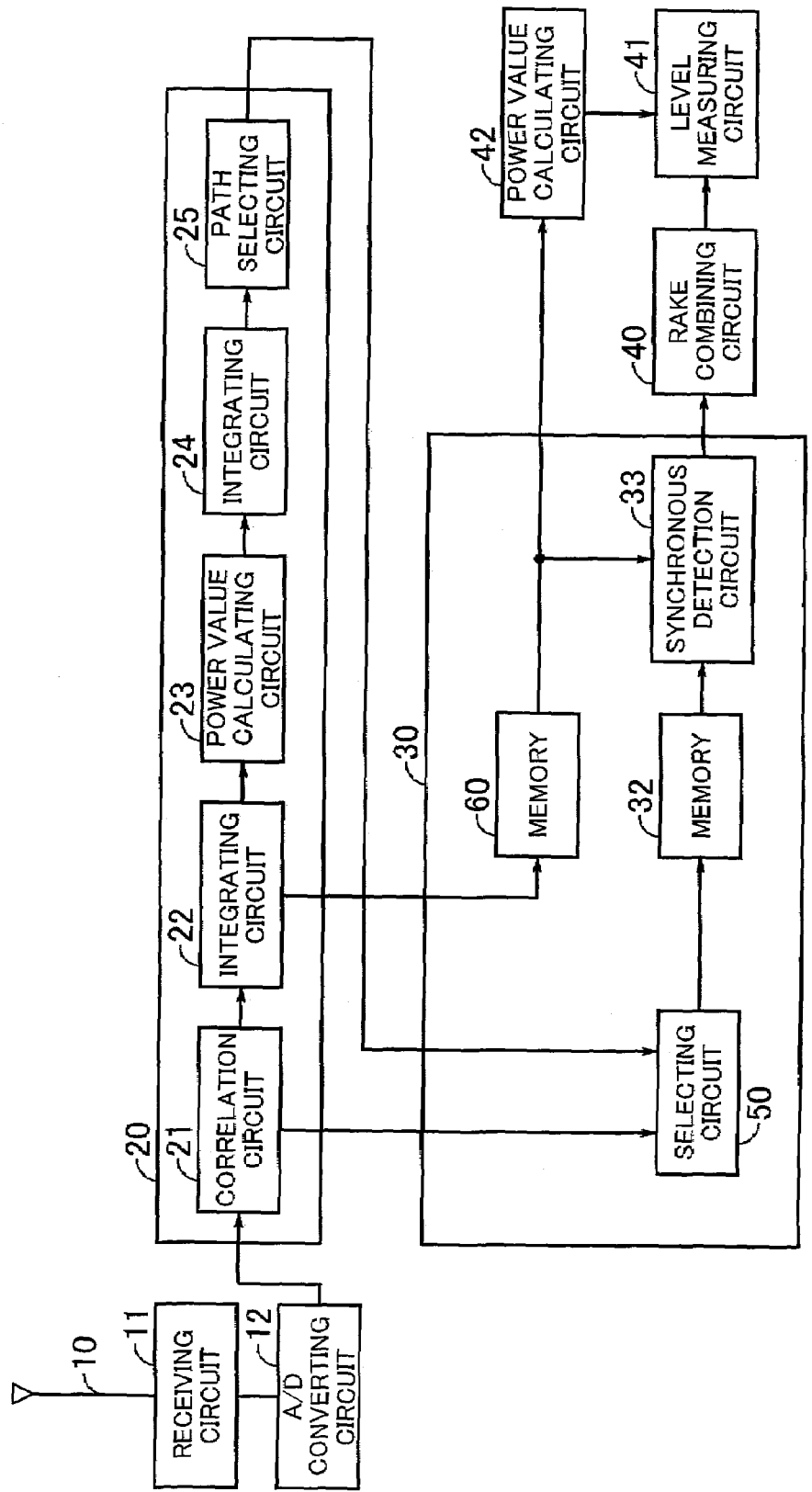
FIG. 6 is a block diagram for describing the structure of a second embodiment of the present invention.

FIG. 6 is a block diagram showing the structure of the second embodiment of the present invention. In FIG. 6, portions corresponding to those in FIG. 2 are expressed by the same symbols and descriptions of them will be omitted.

This embodiment differs from the first embodiment shown in FIG. 2 in that the channel estimation circuit 34 is removed and that a memory 60 to which output from the integrating circuit 22 is provided is added. Except for this, the structure of this embodiment is the same as that of the first embodiment.

The memory 60 temporarily stores data output from the integrating circuit 22 and provides it to the synchronous detection circuit 33 and power value calculating circuit 42.

The channel estimation circuit 34 shown in FIG. 2 performs the process of integrating one slot of data stored in the memory 32. This operation is the same as that of the integrating circuit 22. That is to say, the integrating circuit 22 can also be used as the channel estimation circuit 34. Therefore, in the second embodiment, the channel estimation circuit 34 is removed.

Operation in the second embodiment is the same as that in the first embodiment shown in FIG. 2, except that the integrating circuit 22 integrates one slot of data for the channel estimation circuit 34. Detailed descriptions of it therefore will be omitted.

The above embodiment enables the path tracking section 20 and data demodulating section 30 to share the integrating circuit 22. As a result, the size of circuits can be reduced further.

Now, a third embodiment of the present invention will be described.

Figure 7:
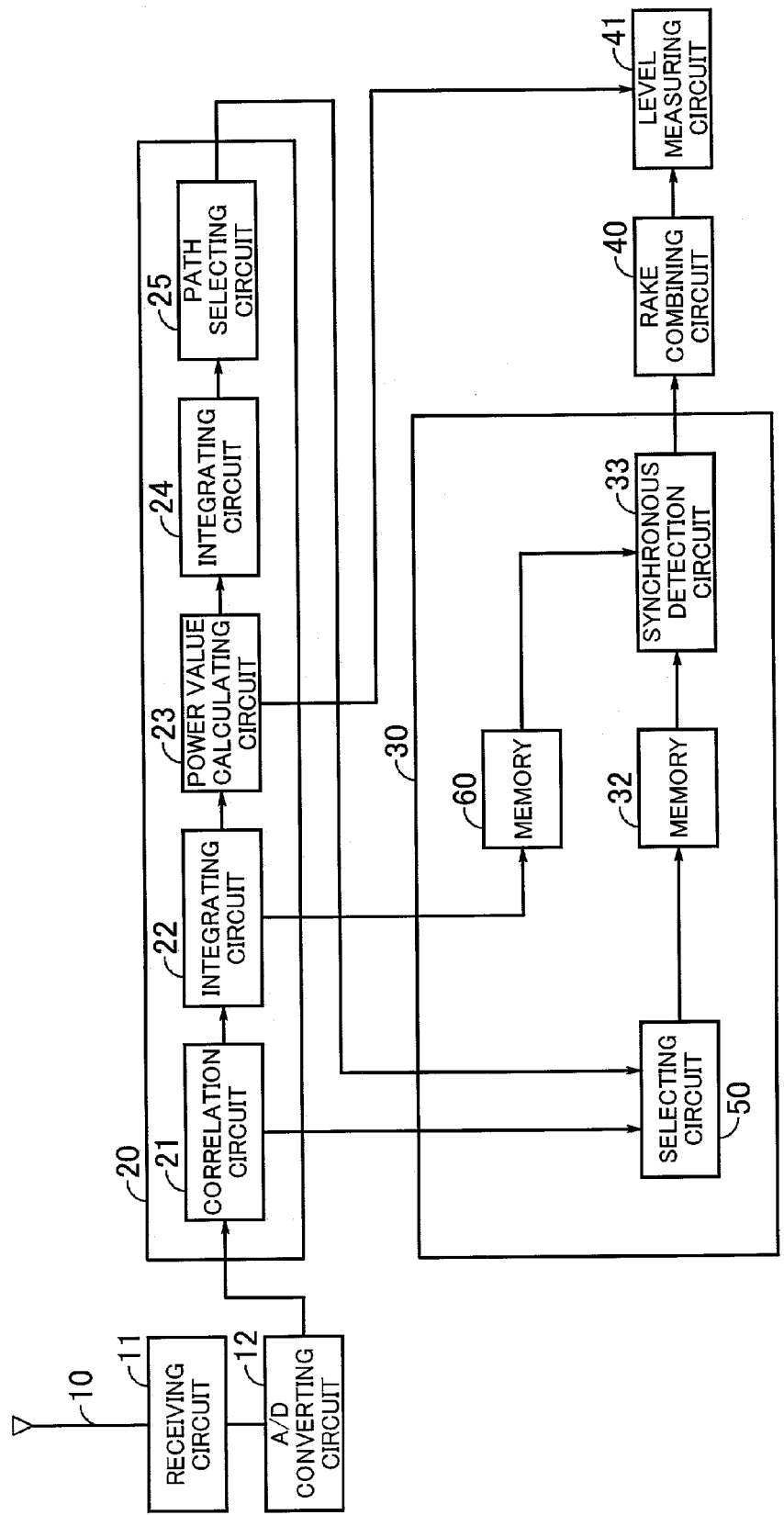
FIG. 7 is a block diagram for describing the structure of a third embodiment of the present invention.
Figure 8:
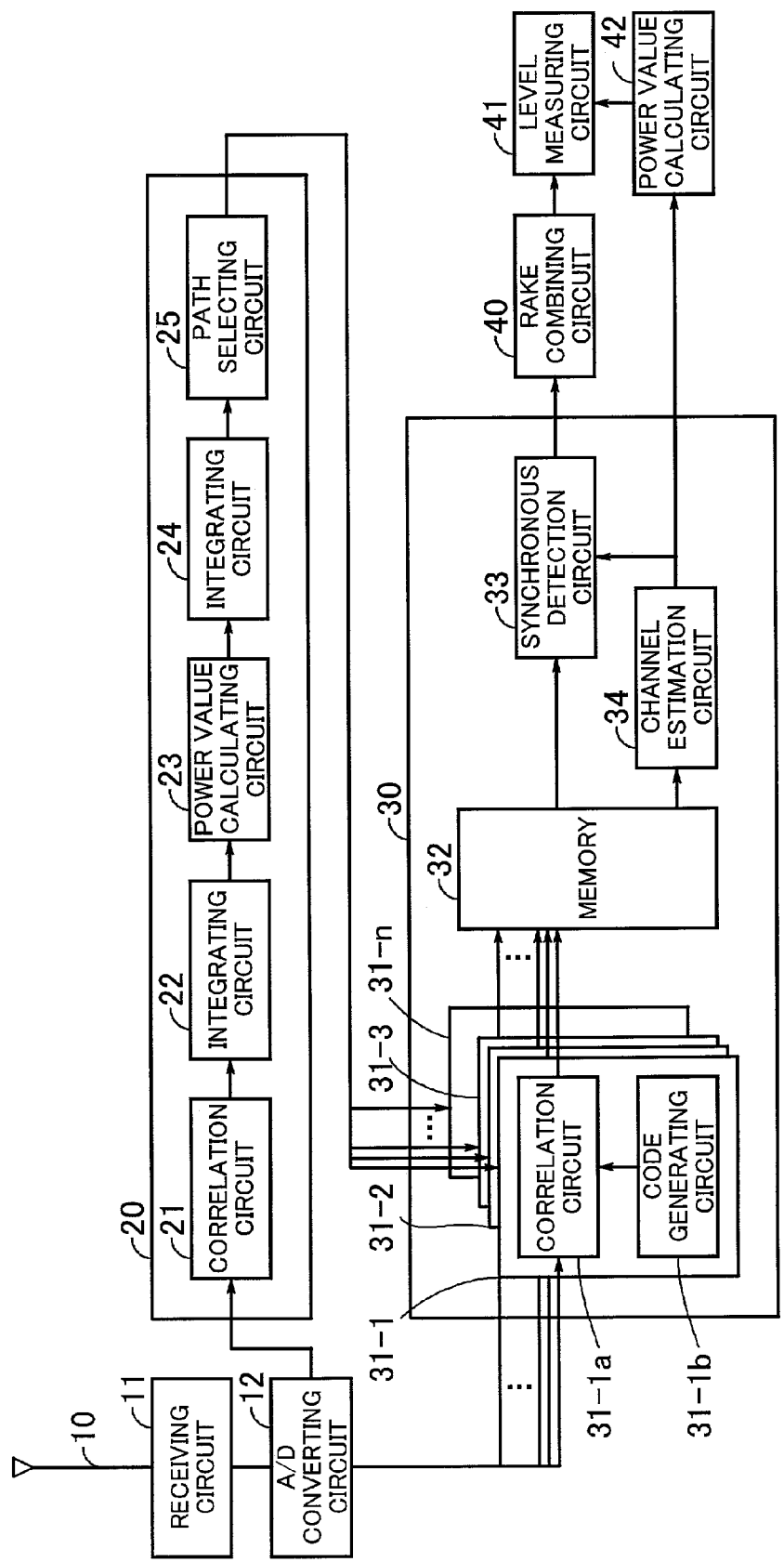
FIG. 8 is a block diagram for describing the structure of a conventional receiving unit.

FIG. 7 is a block diagram showing the structure of the third embodiment of the present invention. In FIG. 7, portions corresponding to those in FIG. 6 are expressed by the same symbols and descriptions of them will be omitted.

This embodiment differs from the second embodiment shown in FIG. 6 in that the power value calculating circuit 42 is removed and that output from the power value calculating circuit 23 is provided to the level measuring circuit 41. Except for this, the structure of this embodiment is the same as that of the second embodiment.

The power value calculating circuit 23 calculates the geometric mean of data output from the integrating circuit 22 and provides it to the integrating circuit 24 and level measuring circuit 41.

The power value calculating circuit 42 shown in FIG. 6 performs the process of calculating the geometric mean of data output from the memory 60. This process is the same as that performed by the power value calculating circuit 23. That is to say, the power value calculating circuit 23 can also be used as the power value calculating circuit 42. Therefore, in the third embodiment of the present invention, the power value calculating circuit 42 is removed.

Operation in the third embodiment is the same as that in the second embodiment, except that the power value calculating circuit 23 calculates a power value on the basis of data for the power value calculating circuit 42. Detailed descriptions of it therefore will be omitted.

The above embodiment enables the path tracking section 20 and data demodulating section 30 to share the power value calculating circuit 23. As a result, the size of circuits can be reduced further.

The path tracking section 20 and data demodulating section 30 shown in the above embodiments can be semiconductor devices. In addition, these semiconductor devices can include their peripheral circuits, such as the A/D converting circuit 12, RAKE combining circuit 40, or level measuring circuit 41.

As has been described in the foregoing, a receiving unit for receiving signals sent from a base station and demodulating the signals, according to the present invention, comprises receiving means for receiving signals sent from the base station and transmitted through a plurality of paths, path tracking means for detecting timing of each of the plurality of paths through which the signals received by the receiving means were transmitted, demodulating means for demodulating the received signals by performing a despreading process according to the timing of the plurality of paths detected by the path tracking means, correlation value calculating means for calculating a correlation value between the received signals and a spreading code, and destination selecting means for providing output from the correlation value calculating means to the path tracking means in the case of performing a path tracking process by the path tracking means and for providing output from the correlation value calculating means to the demodulating means in the case of demodulating the received signals by the demodulating means. As a result, the correlation value calculating means is shared by dividing time and the size of circuits can be reduced.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A receiving unit for receiving and demodulating signals sent from a base station, the receiving unit comprising:
   a receiving section for receiving signals sent from the base station and transmitted through a plurality of paths;
   a path tracking section for detecting timing of each of the plurality of paths through which the signals received by the receiving section were transmitted;
   a demodulating section for demodulating the received signals by performing a despreading process according to the timing of the plurality of paths detected by the path tracking section;
   a correlation value calculating section for calculating a correlation value between the received signals and a spreading code; and
   a destination selecting section for providing output from the correlation value calculating section to the path tracking section in the case of performing a path tracking process by the path tracking section and for providing output from the correlation value calculating section to the demodulating section in the case of demodulating the received signals by the demodulating section.

2. The receiving unit according to claim 1, further comprising a level measuring section for referring to signals demodulated by the demodulating section and measuring a level of the received signals.

3. The receiving unit according to claim 2, wherein the path tracking section includes an integrating section for integrating the output from the correlation value calculating section, further wherein the level measuring section measures the level of the received signals based on output from the integrating section.

4. The receiving unit according to claim 3, wherein the path tracking section includes a power calculating section for calculating power of the received signals based on the output from the integrating section, further wherein the level measuring section refers to the output from the integrating section and output from the power calculating section and measures the level of the received signals.

5. The receiving unit according to claim 2, wherein the level measuring section measures the level of the received signals by RAKE combining.

6. The receiving unit according to claim 1, wherein the destination selecting section provides the output from the correlation value calculating section to the path tracking section in a predetermined cycle.

7. The receiving unit according to claim 6, wherein the predetermined cycle is changed properly according to relation between the receiving unit and the base station.

8. The receiving unit according to claim 1, wherein the correlation value calculating section is a matched filter.

9. The receiving unit according to claim 1, further comprising a path selecting section for selecting data corresponding to a desired path based on the output from the correlation value calculating section and providing the data to the demodulating section.

10. The receiving unit according to claim 9, wherein the path selecting section temporarily stores data output from the correlation value calculating section in a semiconductor memory and selects the desired path by reading out data from an address corresponding to the desired path supplied from the path tracking section.

11. A receiving method for receiving and demodulating signals sent from a base station, the receiving method comprising:
  a receiving step for receiving signals sent from the base station and transmitted through a plurality of paths;
  a path tracking step for detecting timing of each of the plurality of paths through which the signals received by the receiving step were transmitted;
  a demodulating step for demodulating the received signals by performing a despreading process according to the timing of the plurality of paths detected by the path tracking step;
  a correlation value calculating step for calculating a correlation value between the received signals and a spreading code; and
  a destination selecting step for providing output from the correlation value calculating step to input in the path tracking step in the case of performing a path tracking process by the path tracking step and for providing output from the correlation value calculating step to input in the demodulating step in the case of demodulating the received signals by the demodulating step.

12. A semiconductor device for processing signals sent from a base station, the semiconductor device comprising:
  a path tracking section for detecting timing of each of a plurality of paths through which signals were received;
  a demodulating section for demodulating the received signals into an original data by performing a despreading process according to the timing of the plurality of paths detected by the path tracking section;
  a correlation value calculating section for calculating a correlation value between the received signals and a spreading code; and
  a destination selecting section for providing output from the correlation value calculating section to the path tracking section in the case of performing a path tracking process by the path tracking section and for providing output from the correlation value calculating section to the demodulating section in the case of demodulating the received signals by the demodulating section.

13. The semiconductor device according to claim 12, further comprising a level measuring section for referring to signals demodulated by the demodulating section and measuring a level of the received signals.

14. The semiconductor device according to claim 13, wherein the path tracking section includes an integrating section for integrating the output from the correlation value calculating section, further wherein the level measuring section measures the level of the received signals based on output from the integrating section.

15. The semiconductor device according to claim 14, wherein the path tracking section includes a power calculating section for calculating power of the received signals based on the output from the integrating section, further wherein the level measuring section refers to the output from the integrating section and output from the power calculating section and measures the level of the received signals.

16. The semiconductor device according to claim 13, wherein the level measuring section measures the level of the received signals by RAKE combining.

17. The semiconductor device according to claim 12, wherein the destination selecting section provides the output from the correlation value calculating section to the path tracking section in a predetermined cycle.

18. The semiconductor device according to claim 17, wherein the predetermined cycle is changed properly according to relation between the receiving unit and the base station.

19. The semiconductor device according to claim 12, wherein the correlation value calculating section is a matched filter.

20. The semiconductor device according to claim 12, further comprising a path selecting section for selecting data corresponding to a desired path based on the output from the correlation value calculating section and providing the data to the demodulating section.

21. The semiconductor device according to claim 20, wherein the path selecting section temporarily stores data output from the correlation value calculating section in a semiconductor memory and selects the desired path by reading out data from an address corresponding to the desired path supplied from the path tracking section.

* * * * *